H. M. FRANZEN.
UNIVERSAL LEVEL.
APPLICATION FILED NOV. 1, 1920.

1,409,537.

Patented Mar. 14, 1922.

INVENTOR.
Henry M. Franzen
BY
ATTORNEY

UNITED STATES PATENT OFFICE.

HENRY M. FRANZEN, OF LOS ANGELES, CALIFORNIA.

UNIVERSAL LEVEL.

1,409,537.     Specification of Letters Patent.     Patented Mar. 14, 1922.

Application filed November 1, 1920. Serial No. 420,933.

*To all whom it may concern:*

Be it known that I, HENRY M. FRANZEN, a citizen of the United States, residing at Los Angeles, county of Los Angeles, State of California, have invented certain new and useful Improvements in Universal Levels; and I do declare the following to be a full, clear, and exact description of the same, reference being had to the accompanying drawings, and to the characters of reference marked thereon, which form a part of this specification.

This invention relates to levels, being particularly intended as an improvement over that type shown in my co-pending application for patent Serial No. 360,620, filed Feb. 24th, 1920, and over others of a similar principle of construction.

One of the objects of the present invention is to lighten the weight of the level by lessening the amount of material necessary in its construction for a given size, and by so constructing the same that a much smaller quantity of liquid is used.

The device is therefore particularly adapted to airplane work, where the necessity of keeping weights to a minimum is an important item. At the same time the level may be used for any purpose where its universal indicating qualities will prove of service.

Another object is to provide illuminating means for the level, built therein so as to form a unit therewith, and so arranged that the indicated levels or angles of tilt may be easily read at night, while at the same time there will be no glare to dazzle and blind the operator. This latter feature also makes the device particularly adaptable for airplanes, since the use of the latter for night flying is steadily increasing.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1:
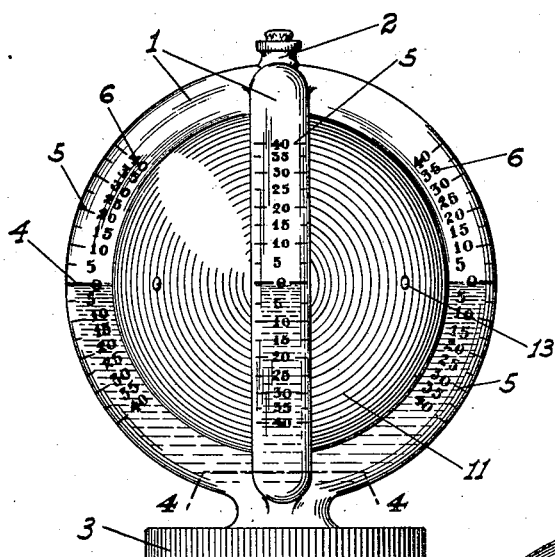
Fig. 1 is a front elevation of the device.
Figure 2:
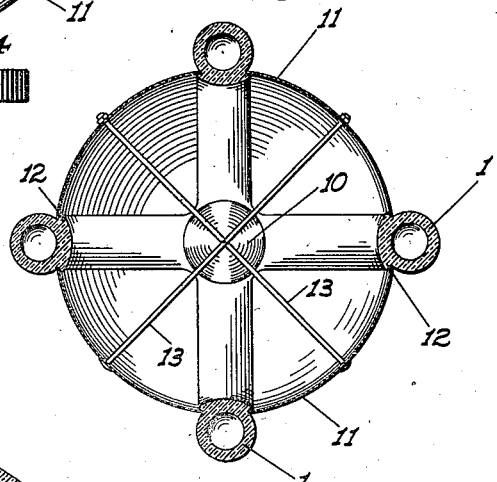
Fig. 2 is a diametrical cross section thereof, on a horizontal plane.
Figure 4:
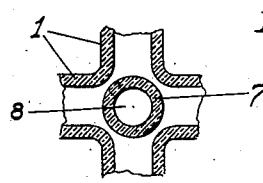
Fig. 4 is a fragmentary cross section taken on a line 4—4 of Fig. 1.
Figure 3:
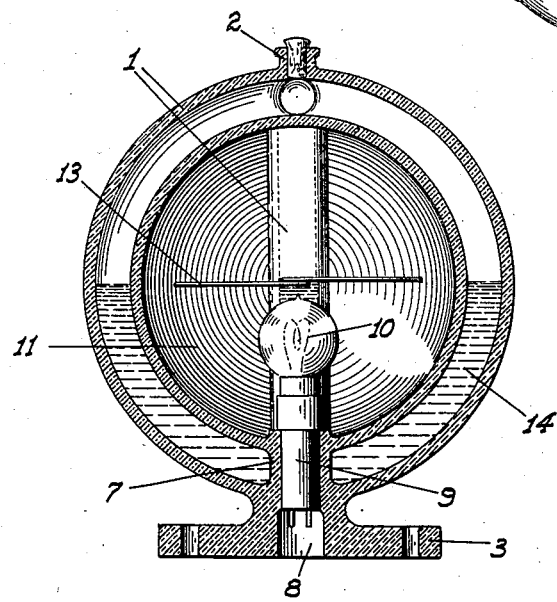
Fig. 3 is a vertical section.

Referring now more particularly to the characters of reference on the drawings, the numeral 1 denotes a pair of hollow circular rings, preferably of glass, which may be either cylindrical or rectangular in cross section, and which intersect each other on a common vertical axis so as to both have the same center, and set at right angles to each other.

These rings have free communication with each other both at the top and bottom points of intersection, and are provided with a common filler tube 2 at the upper end, and are formed with a base 3 whose under face is parallel to the horizontal axes of the rings.

Marked on the outer faces of the rings at the horizontal axes thereof are zero lines 4 above and below which, and subtending a central angle from the common center of the rings, are other lines 5 having angle designating figures 6 placed opposite the same, each figure being taken with the zero line as a base.

At the lower point of intersection of the rings, a boss 7 central with the vertical axes of the rings is formed, the walls of this boss being spaced from the adjacent walls of the rings so that free communication is had therebetween. This boss is orificed as at 8 from the inner face of the rings, the orifice extending through the base, thus forming a tube for the reception of a light-connection socket 9, into the upper end of which a lamp 10 is removably mounted, the lower end of the socket being made as one member of a standard form of electric light plug.

Between each half of the opposed rings is an opaque shield 11 preferably of metal and shaped so as to be a segment of a hollow sphere. By reason of these shields, the rays of the light can only penetrate through the rings, defining the angle-marks and the level of the liquid clearly at night.

The shields are preferably set in somewhat from the cross-sectional center lines of the rings, so that ample space is left for the angle-designating marks to be placed and seen, and may rest against shoulders 12 formed with the rings. These shields must be removable so as to be able to take out and replace the light in the event that the same burns out, and may be held in place against undesired movements by bolts 13 crossing each other and extending between opposite pairs of the shields, one such bolt being sufficient for each pair.

A dark colored fluid 14 is inserted through the filler tube 2, the level of this liquid being at the zero-marks when the base is resting perfectly horizontal.

If desired, a liquid lighter both in color and specific gravity may fill the remainder of the ring-area, so as to prevent the lower liquid from being unduly ruffled and agitated with vibration or jarring.

By reason of the light globe, with which a certain amount of heat is naturally generated, and which is enclosed in an area bounded by the shields and the rings themselves, an even and relatively high temperature may be maintained, thus preventing the liquid from a tendency to solidify in cold weather or at high altitudes.

From the foregoing description, it will be readily seen that I have produced such a device as substantially fulfills the objects of the invention as set forth herein.

While this specification sets forth in detail, the present and preferred construction of the device, still in practice such deviations from such detail may be resorted to that do not form a departure from the spirit of the invention, as defined by the appended claims.

Having thus described my invention, what I claim as new and useful and desire to secure by Letters Patent is:

1. A universal level including a pair of communicating hollow rings intersecting in a vertical plane so as to have a common center and positioned at right angles to each other, said rings being transparent and containing a liquid whose level is normally in the plane of the center of the rings, opaque shields extending between adjacent halves of the rings, and a means for illuminating the area enclosed by the rings and shields.

2. A universal level including a pair of communicating hollow rings intersecting in a vertical plane so as to have a common center and positioned at right angles to each other, said rings being transparent and containing a liquid whose level is normally in the plane of the center of the rings, and shaped to substantially enclose a spherical area, and a light positioned in such area centrally thereof.

3. A universal level including a pair of communicating hollow transparent rings intersecting in a vertical plane so as to have a common center and positioned at right angles to each other, a liquid partially filling the rings, an axial tube formed with the rings at one of such intersecting points and leading from the outside to the inside peripheries of said rings, and a light mounted on the inner end of the tube, the light connections passing therethrough.

4. A universal level comprising transparent and liquid-containing rings intersecting in a vertical plane, opaque and solid shields extending between adjacent portions of the rings and forming therewith a substantially air-tight enclosure, and a means for illuminating such area, whereby a temperature therein relatively greater than that outside said area may be maintained.

5. A universal level comprising transparent and liquid containing rings intersecting in a vertical plane, solid shields extending between adjacent portions of the rings and forming therewith a substantially air tight enclosure, and a heat-generating medium in such enclosure.

In testimony whereof I affix my signature.

HENRY M. FRANZEN.